United States Patent
Liu et al.

(10) Patent No.: US 11,332,602 B2
(45) Date of Patent: May 17, 2022

(54) RESIN FOR USE AS A TIE LAYER IN MULTILAYER STRUCTURE HAVING POLYETHYLENE TEREPHTHALATE

(71) Applicant: Dow Global Technologies LLC, Midland, MI (US)

(72) Inventors: Andong Liu, Shanghai (CN); Yunlong Guo, Shanghai (CN); Yong Zheng, Cary, NC (US); Hongyu Chen, Shanghai (CN); Brian Walther, Clute, TX (US); Yi Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/041,688

(22) PCT Filed: Mar. 29, 2018

(86) PCT No.: PCT/CN2018/081026
§ 371 (c)(1),
(2) Date: Sep. 25, 2020

(87) PCT Pub. No.: WO2019/183870
PCT Pub. Date: Oct. 3, 2019

(65) Prior Publication Data
US 2021/0009795 A1  Jan. 14, 2021

(51) Int. Cl.
*C08L 23/08* (2006.01)
*B32B 27/08* (2006.01)
*B32B 27/30* (2006.01)
*B32B 27/32* (2006.01)
*B32B 27/36* (2006.01)

(52) U.S. Cl.
CPC .......... *C08L 23/0869* (2013.01); *B32B 27/08* (2013.01); *B32B 27/308* (2013.01); *B32B 27/32* (2013.01); *B32B 27/36* (2013.01); *B32B 2250/03* (2013.01); *B32B 2250/24* (2013.01); *B32B 2439/00* (2013.01)

(58) Field of Classification Search
CPC ... C08L 23/0869; B32B 27/08; B32B 27/308; B32B 27/32; B32B 27/36; B32B 2250/03; B32B 2250/24; B32B 2439/00
See application file for complete search history.

(56) References Cited

U.S. PATENT DOCUMENTS

| | | | | |
|---|---|---|---|---|
| 3,651,028 A | * | 3/1972 | Maemoto | C08F 8/32 525/330.5 |
| 4,387,126 A | | 6/1983 | Rebholz | |
| 4,608,417 A | | 8/1986 | Giles, Jr. | |
| 5,104,940 A | | 4/1992 | Hert et al. | |
| 5,656,692 A | * | 8/1997 | Hayes | C08F 8/14 525/330.6 |
| 6,068,897 A | | 5/2000 | Adur et al. | |
| 6,464,683 B1 | | 10/2002 | Samuelson et al. | |
| 7,037,576 B2 | | 5/2006 | Willham et al. | |
| 7,569,276 B2 | * | 8/2009 | Kendig | B32B 27/36 428/423.7 |
| 7,659,000 B2 | | 2/2010 | Burgmeier et al. | |
| 8,188,194 B2 | | 5/2012 | Yoshida et al. | |
| 8,617,677 B2 | | 12/2013 | Trouilhet et al. | |
| 9,525,091 B2 | | 12/2016 | Takanashi et al. | |
| 2003/0023004 A1 | * | 1/2003 | Bendler | C08F 220/14 525/329.7 |
| 2003/0109643 A1 | | 6/2003 | Ching et al. | |
| 2006/0105166 A1 | * | 5/2006 | Lischefski | B32B 27/08 428/349 |
| 2016/0272805 A1 | | 9/2016 | Nakanishi et al. | |
| 2020/0316922 A1 | | 10/2020 | Lee et al. | |

FOREIGN PATENT DOCUMENTS

| | | |
|---|---|---|
| EP | 0170885 | 2/1986 |
| JP | H03121167 A | 5/1991 |
| JP | 2011051303 | 3/2011 |

OTHER PUBLICATIONS

International Search Report & Written Opinion for related PCT Application PCT/CN2018/081026, dated Jan. 4, 2019 (10 pgs).

* cited by examiner

*Primary Examiner* — Michael C Miggins
(74) *Attorney, Agent, or Firm* — Brooks, Cameron & Huebsch, PLLC

(57) ABSTRACT

The disclosure relates to a tie resin formulation with excellent adhesion to polyethylene terephthalate (PET). The resin includes (A) an ethylene acrylate copolymer formed from ethylene and alkyl acrylate, where the ethylene acrylate copolymer has an acrylate content of 10 to 30 weight percent and an ethylene content of 90 to 70 weight percent based on the total weight of the ethylene acrylate copolymer and the acrylate content and (B) a transesterification catalyst; where the resin includes: 30 to 99.999 weight percent of the ethylene acrylate copolymer based on the total weight of the resin; 0.001 to 10 weight percent of the transesterification catalyst based on the total weight of the resin; and (C) 0 to 69.999 of a non-polar polyolefin based on the total weight of the resin.

16 Claims, No Drawings ns under 35 U.S.C. § 371 of International Application Number PCT/CN2018/081026, filed Mar. 29, 2018 and published as WO 2019/183870 on Oct. 3, 2019, the entire contents of which are incorporated herein by reference in its entirety

TECHNICAL FIELD

The present disclosure relates generally to a resin and more particularly to a resin for use as a tie layer in a multilayer structure having polyethylene terephthalate.

BACKGROUND

Polyethylene terephthalate (PET) film is widely used in packaging for its aesthetics and physical properties such as its high gloss, its clarity and its barrier and rigidity properties. However, PET film lacks sealing properties due to its relative high melting temperature. Therefore, it is a common practice to form packaging films having PET as a backing film with a laminated sealant layer, such as a polyethylene (PE) sealant film. PET, however, is a material well known for its poor adhesion to other polymers such as PE. So, achieving good adhesion between PET (or its derivatives such as polyethylene terephthalate glycol, PET-g), with a sealant film (e.g., a PE sealant film) in coextrusion and extrusion lamination processes is a challenge in the packaging business.

One approach to improving the adhesion of polymer films to PET has been to use a primer during the coextrusion or extrusion lamination process. Among the issues, however, is drying the primer solution on the PET film can adversely affect the output of the process and adds additional costly manufacturing steps.

Another approach in trying to improve adhesion of polymer films to PET during the coextrusion or extrusion lamination process is to use a resin as a "tie-layer." Examples of resins for use as "tie-layers" include BYNEL®, LOTADER®, AMPLIFY™, ADMER™. Even though a variety of such resins are available as "tie-layers" for use with PET films, few, if any, can achieve the same level of adhesion that is seen in multilayer structures using tie layer to adhere EVOH or nylon film layers with PE film layers. One theory behind this lack of improvement in bonding to PET films is the difficulties associated with the lack of functional groups and polarity and constrained chain mobility caused by the phenyl rings in PET.

As such, there continues to be a need for resins that can help as tie-layers between PET and other polymer films (e.g., PE films).

SUMMARY

The present disclosure relates to a resin formulation with excellent adhesion to polyethylene terephthalate (PET). The resin of the present disclosure comprises an ethylene acrylate copolymer and a transesterification catalyst, which shows higher bonding strength than the pure ethylene acrylate copolymer based counterparts or those based on ethylene acrylate copolymers. The disclosure is based on the discovery that the transesterification catalyst in the resin of the present disclosure can enhance the bonding of the resin to the PET film during coextrusion or extrusion lamination processing. Specifically, the resin of the present disclosure includes an ethylene acrylate copolymer that helps to enhance the bonding strength to the PET through reactions between ester and hydroxyl groups using the transesterification catalyst. For example, the transesterification catalyst in the resin of the tie layer and PET at a certain condition enable better interfacial entanglement by triggering and accelerating the transesterification reaction between ester and hydroxyl groups.

The resin for use as a tie layer in a multilayer structure of the present disclosure includes (A) an ethylene acrylate copolymer formed from ethylene and alkyl acrylate, where the ethylene acrylate copolymer has an acrylate content of 10 to 30 weight percent and an ethylene content of 90 to 70 weight percent, where the weight percent is based on the total weight of the ethylene acrylate copolymer and the acrylate content and the ethylene content of the ethylene acrylate copolymer totals 100 weight percent; and (B) a transesterification catalyst selected from the group of zinc acetate ($Zn(OOCH_3)_2$), titanium butoxide ($Ti(OBU)_4$), zinc oxide (ZnO) or combinations thereof; where the resin includes: 30 to 99.999 weight percent of the ethylene acrylate copolymer based on the total weight of the resin; 0.001 to 10 weight percent of the transesterification catalyst based on the total weight of the resin; and (C) 0 to 69.999 of a non-polar polyolefin based on the total weight of the resin, where the weight percent of the ethylene acrylate copolymer, the transesterification catalyst and the non-polar polyolefin of the resin totals 100 weight percent. For the resin, the alkyl acrylate is selected from the group consisting of methyl acrylate, ethyl acrylate, n-butyl acrylate, tert-butyl acrylate, isopropyl acrylate or mixtures thereof.

In one example for various embodiments of the present disclosure, the resin includes 50 to 99.999 weight percent of the ethylene acrylate copolymer based on the total weight of the resin; 0.001 to 5 weight percent of the transesterification catalyst based on the total weight of the resin; and 0 to 49.999 of a non-polar polyolefin based on the total weight of the resin. In another example of other embodiments, the resin includes 80 to 99.999 weight percent of the ethylene acrylate copolymer based on the total weight of the resin; 0.001 to 2.5 weight percent of the transesterification catalyst based on the total weight of the resin; and 0 to 19.999 of a non-polar polyolefin based on the total weight of the resin.

For the various embodiments, the non-polar polyolefin of the resin is selected from the group consisting of an ethylene based non-polar polyolefin, a propylene based non-polar polyolefin or combinations thereof. Specific embodiments of the non-polar polyolefin include those selected from the group consisting of polyethylene homopolymers, polypropylene homopolymers or combinations thereof.

In a specific embodiment, the ethylene acrylate copolymer of the resin is an ethylene ethyl acrylate copolymer having an acrylate content of 15 weight percent and an ethylene content of 85 weight percent. In an additional specific embodiment, the ethylene acrylate copolymer of the resin is an ethylene methyl acrylate copolymer having an acrylate content of 29 weight percent and an ethylene content of 71 weight percent. For these specific embodiments, the transesterification catalyst is zinc acetate ($Zn(OOCH_3)_2$), where the resin includes 2 weight percent acetate ($Zn(OOCH_3)_2$) and 0 weight percent of the non-polar polyolefin based on the total weight of the resin.

The present disclosure also provides for a multilayer structure that includes at least three layers arranged in order Layer A/Layer B/Layer C, where each of the at least three layers has a first major surface and a second major surface opposite the first major surface. Layer A comprises a polyolefin film; Layer B comprises the resin provided herein, where a first major surface of Layer B is in adhering contact with the second major surface of Layer A, and Layer C comprises polyethylene terephthalate film, where the first major surface of Layer C is in adhering contact with the second major surface of Layer B.

For Layer A, the polyolefin film can be selected from the group consisting of a film of polyethylene, polypropylene or mixtures thereof. Preferably, the polyolefin film is a film of polyethylene. In an additional embodiment, the polyolefin film could be replaced by a second polyethylene terephthalate film different from Layer C. Examples include, but are not limited to, Layer A being PEG while Layer C is polyethylene terephthalate glycol, PET-g. Alternatively, Layer A could be PEG-g while Layer C is PET.

The present disclosure also provides for a package formed with the multilayer structure as provided herein.

DETAILED DESCRIPTION

Unless stated to the contrary, implicit from the context, or customary in the art, all parts and percents are based on weight, all temperatures are in degree Celsius (° C.), and all test methods are current as of the filing date of this disclosure.

The term "composition," as used herein, refers to a mixture of materials that comprise the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), the term copolymer and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "polyolefin", as used herein, refers to a polymer that comprises, in polymerized form, a majority amount of olefin monomer, for example ethylene or propylene (based on the weight of the polymer), and optionally may comprise one or more comonomers.

The term, "ethylene acrylate copolymer," as used herein, refers to a copolymer that comprises, in polymerized form, a majority amount of ethylene monomer (based on the weight of the copolymer), and an alkyl acrylate.

The term, "non-polar polyolefin," as used herein, refers to a polyolefin that comprises, in polymerized form, a majority amount of olefin monomer, for example ethylene or propylene (based on the weight of the polymer), and optionally may comprise one or more comonomers, where the resulting polyolefin displays no polarity (e.g., no net positive or negative charge present in the non-polar polyolefin).

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. To avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm³, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm³, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices I2 (or 12) is measured in accordance with ASTM D-1238 at 190° C. and at a 2.16 kg load. The values are reported in g/10 min. "Melt flow rate" is used for polypropylene based resins and determined according to ASTM D1238 (230° C. at 2.16 kg).

Additional properties and test methods are described further herein.

Resin for Use as a Tie Layer

In one aspect, the present disclosure provides a resin for use as a tie layer in a multilayer structure that includes (A) an ethylene acrylate copolymer formed from ethylene and alkyl acrylate, where the ethylene acrylate copolymer has an acrylate content of 10 to 30 weight percent (wt. %) and an ethylene content of 90 to 70 wt. %, where the wt. % is based on the total weight of the ethylene acrylate copolymer and the acrylate content and the ethylene content of the ethylene acrylate copolymer totals 100 wt. %; and (B) a transesterification catalyst selected from the group of zinc acetate ($Zn(OOCH_3)_2$), titanium butoxide ($Ti(OBU)_4$), zinc oxide (ZnO) or combinations thereof; where the resin includes: 30 to 99.999 wt. % of the ethylene acrylate copolymer based on the total weight of the resin; 0.001 to 10 wt. % of the transesterification catalyst based on the total weight of the resin; and (C) 0 to 69.999 wt. % of a non-polar polyolefin based on the total weight of the resin, where the weight percent of the ethylene acrylate copolymer, the transesterification catalyst and the non-polar polyolefin of the resin totals 100 weight percent.

In one example for various embodiments of the present disclosure, the resin includes 50 to 99.999 weight percent of the ethylene acrylate copolymer based on the total weight of the resin; 0.001 to 5 weight percent of the transesterification catalyst based on the total weight of the resin; and 0 to 49.999 of a non-polar polyolefin based on the total weight of the resin. In another example of other embodiments, the resin includes 80 to 99.999 weight percent of the ethylene acrylate copolymer based on the total weight of the resin; 0.001 to 2.5 weight percent of the transesterification catalyst based on the total weight of the resin; and 0 to 19.999 of a non-polar polyolefin based on the total weight of the resin.

The resin can be formed by admixing the ethylene acrylate copolymer the transesterification catalyst and, when present, the non-polar polyolefin in a melt state via an extrusion process or batch mixer, as are known in the art. The duration of admixing is such that a homogenous mixture of the ethylene acrylate copolymer the transesterification catalyst and, when present, the non-polar polyolefin is produced, where the admixture is the resin of the present disclosure. Heat can be added to the mixing process, as needed, to allow the ethylene acrylate copolymer and, when present, the non-polar polyolefin to be mixed with the transesterification catalyst in a melt state. Mixing can take place at atmospheric pressure.

While not wishing to be bound by any particular theory, it is believed that the use of the transesterification catalyst in the resin of the present disclosure helps to enhance the bonding of the PET layer to layers with a reactive proton. Examples of such reactive protons can include the hydroxyl functional groups of the ethylene acrylate copolymer in the resin. Such hydroxyl groups might also be present for reaction in the polyolefin film of the multilayer as discussed herein. For example, hydroxyl groups could be formed on the polyolefin layer(s) via high energy surface activation such as using corona discharge or flame treatment. Other functional groups having a reactive proton on the surface of a polymer film being used with the resin of the present disclosure to bond to the PET layer can include amine groups (NH functionality), metal hydroxide groups (metal —OH functionality), and sulfide groups (SH functionality). These functional groups may be a chemical component in a polymer layer such as, for example, a polyethylene glycol and others containing the aforementioned functionalities. Thus, tie layers formed from a resin of the present disclosure can be used between a variety of other layers in a multilayer structure as will be evident to those of skill in the art based on the teachings herein.

Ethylene Acrylate Copolymer

The ethylene acrylate copolymer of the present disclosure has an acrylate content of 10 to 30 weight percent and an ethylene content of 90 to 70 weight percent, where the weight percent is based on the total weight of the ethylene acrylate copolymer and the acrylate content and the ethylene content of the ethylene acrylate copolymer totals 100 weight percent. All individual values and subranges from 10 to 30 wt. % of the acrylate content are included and disclosed herein; for example, the amount of the acrylate content in the ethylene acrylate copolymer can be from a lower limit of 10, 12, 14, 16, 18 or 20 wt. % to an upper limit of 22, 24, 26, 28 or 30 wt. %. Similarly, all individual values and subranges from 90 to 70 wt. % of the ethylene content are included and disclosed herein; for example, the amount of the ethylene content in the ethylene acrylate copolymer can be from a lower limit of 70, 72, 74, 76, 78 or 80 wt. % to an upper limit of 82, 84, 86, 88 or 90 wt. %. So, in a preferred embodiment, the ethylene acrylate copolymer has an acrylate content of 10 to 30 weight percent and an ethylene content of 90 to 70 weight percent, where the weight percent is based on the total weight of the ethylene acrylate copolymer and the acrylate content and the ethylene content of the ethylene acrylate copolymer totals 100 weight percent. Most preferably, the ethylene acrylate copolymer has an acrylate content of 15 to 25 weight percent and an ethylene content of 75 to 85 weight percent, where the weight percent is based on the total weight of the ethylene acrylate copolymer and the acrylate content and the ethylene content of the ethylene acrylate copolymer totals 100 weight percent.

The ethylene acrylate copolymer has a density of 0.85 to 0.96 g/cm³. All individual values and subranges from 0.85 g/cm³ to 0.96 g/cm³ are included herein and disclosed herein; for example, the density of the ethylene acrylate copolymer can be from a lower limit of 0.85, 0.86, 0.87, 0.88, 0.89 or 0.90 g/cm³ to an upper limit of 0.94, 0.95, or 0.96 g/cm³. Preferably, the ethylene acrylate copolymer has a density of 0.89 to 0.94 g/cm$^3$. Most preferably, the ethylene acrylate copolymer has a density of 0.92 to 0.94 g/cm$^3$.

In some embodiments, the ethylene acrylate copolymer has a melt index ($I_2$) of 0.5 g/10 minutes to 50 g/10 minutes. All individual values and subranges from 0.5 g/10 minutes to 50 g/10 minutes are included herein and disclosed herein. For example, the ethylene acrylate copolymer can have a lower limit of the melt index of 0.5, 1, 1.5 or 2 g/10 minutes to an upper limit of 25, 30, 40 or 50 g/10 minutes. In some embodiments, the ethylene acrylate copolymer can have a melt index of 0.5 to 30 g/10 minutes, preferably 2 to 25 g/10 minutes. The ethylene acrylate copolymer can be prepared according to methods known in the art.

To one skilled in the art of ethylene acrylate chemistry, it is known that these polymers can be produced via high pressure tube or autoclave reactors using a range or free radical initiators. Any method for producing these polymers may be applied. The ethylene/(m)ethyl acrylate copolymer used in embodiments of the present invention is characterized as a random copolymer. Such ethylene/(m)ethyl acrylate copolymers can be prepared at high pressure by the action of a free-radical polymerization initiator, acting on a mixture of ethylene and methyl acrylate and/or ethyl acrylate monomers using techniques known to those of skill in the art. The ethylene/(m)ethyl acrylate copolymers used in polymer blends of the present invention are more precisely referred to as interpolymers because they are formed by the polymerization of a mixture of the comonomers, in contradistinction to copolymers made by "grafting" or "block-polymerization" methods.

The alkyl acrylate used in forming the ethylene acrylate copolymer is selected from the group consisting of methyl acrylate, ethyl acrylate, n-butyl acrylate, tert-butyl acrylate, isopropyl acrylate or mixtures thereof. For the reaction, monomers of ethylene and acrylate, as provided herein, are fed to the reactor in a mole ratio of ethylene to acrylate sufficient to provide an ethylene acrylate copolymer having the weight percent composition provided herein. Such molar ratios include 1 to 30 mole percent of the alkyl acrylate, preferably 4 to 25 mole percent, and most preferably 7 to 20 mole percent.

Transesterification Catalyst

The resins for use as tie layers according to embodiments of the present disclosure further comprise a transesterification catalyst. The transesterification catalyst can advantageously be included to promote the adhesion of the tie layer to an adjacent PET layer in some embodiments. The resins for use as a tie layer according to some embodiments of the present disclosure can be used in tie layers to adhere a PET layer to another layer comprising a polyolefin. Examples of polyolefins include polyethylene, such as Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

Examples of other polyolefins suitable for use with the resin of the present disclosure include, besides PE, homopolymer and random copolymers Polypropylene, Braskem H110-02N and Nordel polyolefin elastomer 3720P.

In the resin, the transesterification catalyst helps to promote a reaction between ester functional groups of the PET and the hydroxyl groups of the ethylene acrylate copolymer in the resin. As generally understood, examples of transesterification catalysts can be acid, base or amine based compounds that help promote the above noted reaction. For the present disclosure, the preferred transesterification catalysts include those selected from the group of zinc acetate ($Zn(OOCH_3)_2$), titanium butoxide ($Ti(OBU)_4$), zinc oxide (ZnO) or combinations thereof. Other examples of transesterification catalyst include 1,5,7-triazabicyclo[4.4.0]dec-5-ene, benzyldimethylamide, metal salts of tin, zinc magnesium, cobalt, calcium, titanium and zirconium, where the metal salts can be a chlorate salt or a sulfate, among others.

The amount of catalyst used in the resin can depend on several factors including the amount of ethylene acrylate copolymer, the non-polar polyolefin (when present), the catalyst used, the composition of the PET layer and other layers adjacent to the tie layer formed from the resin, and other factors. In some embodiments, the resin comprises 0.001 to 10 weight percent of the transesterification catalyst based on the total weight of the resin. The resin, in some embodiments, comprises 0.01 to 5 weight percent of the transesterification catalyst based on the total weight of the resin. The resin comprises 0.1 to 2 weight percent of the transesterification catalyst based on the total weight of the resin.

Non-Polar Polyolefin

In some embodiments, the resin for use in a tie layer may further optionally include a non-polar polyolefin. The non-polar polyolefin is optionally used in the resin in an amount of 0 to 69.999 wt. % based on the total weight of the resin, where the weight percent of the ethylene acrylate copolymer, the transesterification catalyst and the non-polar polyolefin of the resin totals 100 weight percent. The amount of non-polar polyolefin added to the tie layer can be selected to reduce the rigidity and/or improve the adhesion of the tie layer formed from the resin.

The non-polar polyolefin has a density of 0.85 to 0.96 g/cm$^3$. All individual values and subranges from 0.85 g/cm$^3$ to 0.96 g/cm$^3$ are included herein and disclosed herein; for example, the density of the non-polar polyolefin can be from a lower limit of 0.85, 0.86, 0.87, 0.88 or 0.89 g/cm$^3$ to an upper limit of 0.94, 0.95 or 0.96 g/cm$^3$. Preferably, the non-polar polyolefin has a density of 0.85 to 0.96 g/cm$^3$. Most preferably, the non-polar polyolefin has a density of 0.87 to 0.95 g/cm$^3$.

In some embodiments, the non-polar polyolefin has a melt index ($I_2$) of 0.1 g/10 minutes to 100 g/10 minutes. All individual values and subranges from 0.1 g/10 minutes to 100 g/10 minutes are included herein and disclosed herein. For example, the non-polar polyolefin can have a lower limit of the melt index of 0.1, 0.5 or 1 g/10 minutes to an upper limit of 20, 40, 60 or 100 g/10 minutes. In some embodiments, the non-polar polyolefin can have a melt index of 0.2 to 50 g/10 minutes, preferably 0.5 to 25 g/10 minutes.

For the various embodiments, the non-polar polyolefin of the resin is selected from the group consisting of an ethylene based non-polar polyolefin, a propylene based non-polar polyolefin or combinations thereof. Specific embodiments of the non-polar polyolefin include those selected from the group consisting of polyethylene homopolymers, polypropylene homopolymers or combinations thereof. Other examples of non-polar polyolefins include polyethylene butene copolymer, polyethylene hexene copolymer and polyethylene octene copolymer. Examples of commercially available non-polar polyolefins include PE available from The Dow Chemical Company under the names DOWLEX™, ELITE™, ELITE™ AT, AFFINITY™, INFUSE™, ENGAGE™, INTUNE™, ATTANE™, INNATE™ and AGILITY™.

When formed into a tie layer, resins of the present disclosure can provide a number of advantages. For example, in addition to providing adhesion between a PET layer and adjacent polyolefin layers, tie layers formed from some embodiments of the present disclosure can further act as a moisture and/or gas barrier, particularly when positioned adjacent to a conventional barrier layer, such as a barrier layer comprising ethylene vinyl alcohol and/or polyamide. This can advantageously protect against deterioration of gas barrier properties when a multilayer structure is exposed to high moisture or relative humidity in some embodiments. Likewise, the use of such tie layers, in some embodiments, can eliminate the need for other approaches to protect against gas barrier deterioration (e.g., increasing the thickness of LDPE or LLDPE layers in the structure, adding HDPE layer(s) to the structure, including an extra amount of EVOH or polyamide in the barrier layer or structure, etc.).

For the various embodiments, it is preferred that for the resin there be a large difference between the melt index value of the ethylene acrylate copolymer and, when used, the non-polar polyolefin. This large difference is expressed as a melt index ratio of the ethylene acrylate copolymer and the non-polar polyolefin, where a ratio of the MI for the ethylene acrylate copolymer ($MI_{EAC}$) to the melt index of the non-polar polyolefin ($MI_{NPP}$) (ratio $MI_{EAC}/MI_{NPP}$) can be from 0.1 to 10. Preferably, the ratio $MI_{EAC}/MI_{NPP}$ can be from 1 to 7. More preferably, the ratio $MI_{EAC}/MI_{NPP}$ can be from 1 to 5.

By way of a specific embodiment, the ethylene acrylate copolymer of the resin is an ethylene ethyl acrylate copolymer having an acrylate content of 15 weight percent and an ethylene content of 85 weight percent. In an additional specific embodiment, the ethylene acrylate copolymer of the resin is an ethylene methyl acrylate copolymer having an acrylate content of 29 weight percent and an ethylene content of 71 weight percent. For these specific embodiments, the transesterification catalyst is zinc acetate ($Zn(OOCH_3)_2$), where the resin includes 2 weight percent acetate ($Zn(OOCH_3)_2$) and 0 weight percent of the non-polar polyolefin based on the total weight of the resin.

In embodiments of the present disclosure related to multilayer structures, a tie layer formed from a resin of the present disclosure can be in adhering contact with a PET layer. The PET layer may include one or more ester groups. Examples of commercially available PET that can be used in embodiments of the present disclosure include Lumirror from Japan Toray company and Mylar from Teijin DuPont Films Japan.

Additional layers of the multilayer structure can include layers formed from polyamides (nylons), amorphous polyamides (nylons), and/or ethylene vinyl alcohol copolymers (EVOH) and can include scavenger materials and compounds of heavy metals like cobalt with MXD6 nylon. EVOH can include a vinyl alcohol copolymer having 27 to 44 mol % ethylene, and is prepared by, for example, hydrolysis of vinyl acetate copolymers. Examples of commercially available EVOH that can be used in embodiments of the present disclosure include EVAL™ from Kuraray and Noltex™ and Soarnol™ from Nippon Goshei.

In some embodiments, the additional layer can comprise EVOH and an anhydride and/or carboxylic acid functionalized ethylene/alpha-olefin interpolymer, such as those barrier layers disclosed in PCT Publication No. WO 2014/113623, which is hereby incorporated by reference. This inclusion of anhydride and/or carboxylic acid functionalized ethylene/alpha-olefin interpolymer can enhance the flex crack resistance of the EVOH and is believed to provide less points of stress at the interlayer with the tie resin, hence decreasing formation of voids that could negatively impact the gas barrier properties of the overall multilayer structure.

In embodiments where the layer comprises a polyamide, the polyamide can include polyamide 6, polyamide 9, polyamide 10, polyamide 11, polyamide 12, polyamide 6,6, polyamide 6/66 and aromatic polyamide such as polyamide 6I, polyamide 6T, MXD6, or combinations thereof.

In some embodiments, a tie layer formed from a resin of the present disclosure can be in adhering contact with another layer, in addition to a PET layer. For example, in some embodiments, the tie layer can additionally be in adhering contact with a layer comprising polyethylene (i.e., the resin of the tie layer is between the polyethylene layer and the PET layer). In such an embodiment, the polyethylene can be any polyethylene and its derivatives (e.g., ethylene-propylene copolymer) known to those of skill in the art to be suitable for use as a layer in a multilayer structure based on the teachings herein. The polyethylene can be used in such a layer, as well as other layers in the multilayer structure, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof.

Some embodiments of multilayer structures can include layers beyond those described above. For example, while not necessarily in adhering contact with a tie layer according to the present invention, a multilayer structure can further comprise other layers typically included in multilayer structures depending on the application including, for example, other barrier layers, sealant layers, other tie layers, other polyethylene layers, polypropylene layers, etc. For example, in some embodiments, a multilayer structure of the present disclosure can include both an inventive tie layer (e.g., a tie layer formed from a resin of the present invention) and a conventional tie layer. As to conventional tie layers, the conventional tie layer can be tie layers known to those of skill in the art to be suitable for use in adhering different layers in a multilayer structure based on the teachings herein.

Additionally, other layers such as printed, high modulus, high gloss layers may be laminated to multilayer structures (e.g., films) of the present disclosure. Further, in some embodiments, the multilayer structure can be extrusion coated to a fiber containing substrate such as paper.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Multilayer Structures

Embodiments of the present disclosure also relate to multilayer structures that include a layer formed from a resin of the present invention. In one aspect, a multilayer structure comprises at least three layers arranged in order Layer A/Layer B/Layer C, where each of the at least three layers has a first major surface and a second major surface opposite the first major surface. Layer A comprises a polyolefin film; Layer B comprises the resin provided herein, where a first major surface of Layer B is in adhering contact with the second major surface of Layer A, and Layer C comprises polyethylene terephthalate film, where the first major surface of Layer C is in adhering contact with the second major surface of Layer B.

For Layer A, the polyolefin film can be selected from the group consisting of a film of polyethylene, polypropylene or mixtures thereof. Preferably, the polyolefin film is a film of polyethylene. In an additional embodiment, the polyolefin film could be replaced by a second polyethylene terephthalate film different from Layer C. Examples include, but are not limited to, Layer A being PEG while Layer C is polyethylene terephthalate glycol, PET-g. Alternatively, Layer A could be PEG-g while Layer C is PET.

It should be understood that in some embodiments the multilayer structure of the present disclosure can include additional layers (e.g., Layer D, Layer E, etc.) such as additional polyethylene layers, which can be formed from the same polyethylene as Layer A, or polyethylene blends, while in other embodiments, such additional layers can be formed from different polyethylenes or polyethylene blends. In other embodiments, the multilayer structure may comprise one or more additional layers adjacent to such polyethylene layers. It should be understood that for the examples above, the first and last layers identified for each example may be the outermost layer in some embodiments, while in other embodiments, one or more additional layers may be adjacent to such layers.

When a multilayer structure comprising the combinations of layers disclosed herein is a multilayer film, the film can have a variety of thicknesses depending, for example, on the number of layers, the intended use of the film, and other factors. In some embodiments, multilayer films of the present disclosure have a thickness of 15 microns to 5 millimeters. Multilayer films of the present invention, in some embodiments, have a thickness of 20 to 500 microns (preferably 50-200 microns). When the multilayer structure is something other than a film (e.g., a rigid container, a pipe, etc.), such structures can have a thickness within the ranges typically used for such types of structures.

Multilayer structures of the present disclosure can exhibit one or more desirable properties. For example, in some embodiments, multilayer structures can exhibit desirable barrier properties, temperature resistance, optical properties, stiffness, sealing, toughness, puncture resistance, and others.

The present disclosure also provides for a package formed with the multilayer structure of the multilayer structure as provided herein. Multilayer structures of the present disclosure can include a combination of two or more embodiments as described herein. Embodiments of the present disclosure also relate to articles comprising any of the multilayer structures (e.g., multilayer films) disclosed herein.

Methods of Preparing Multilayer Structures

When the multilayer structure is a multilayer film or formed from a multilayer film, such multilayer films can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present disclosure in a single extrusion step using techniques known to those of skill in the art based on the teachings herein.

Packages

Multilayer films of the present disclosure can be formed into a variety of packages using techniques known to those of skill in the art. In general, multilayer structures of the present disclosure can be converted into any form of package and deployed under a variety of environmental conditions. Multilayer structures of the present disclosure, in some embodiments, can be particularly useful in converted packages that are subject to, or must undergo high moisture conditions, throughout their service life.

Examples of packages that can be formed from multilayer structures of the present disclosure includes, without limitation, stand-up pouches, bags, extrusion coated paper boards, and others.

Other multilayer structures that can be formed include, for example, multilayer sheets, laminated films, multilayer rigid containers, multilayer pipes, and multilayer coated substrates. Such articles can be formed using techniques known to those of skill in the art based on the teachings herein.

Some embodiments of the disclosure will now be described in detail in the following Examples.

Examples

Raw Materials:

TABLE 1

Raw materials used in Examples

| Brand | Product | Abbreviation | Comonomer Content | MI (190° C./2.16 kg; ASTM D1238) | Density (g/cm$^3$; ASTM D792/ ASTM 1505) |
|---|---|---|---|---|---|
| DOWLEX ™ (The Dow Chemical Company) | 2045G | PE$^a$ | 0 | 1.0 | 0.920 |
| AMPLIFY ™ (The Dow Chemical Company) | EA100 | EEA$^b$ | 15.0 wt. % Ethyl Acrylate (ASTM D3594) | 1.3 | 0.930 |
| LOTRYL ® (ARKEMA) | 29MA03 | EMA$^c$ | 29 wt. % Methyl Acrylate (FTIR, ARKEMA Internal Method) | 3 | 0.95 |

$^a$Polyethylene;
$^b$Ethylene Ethyl Acrylate copolymer;
$^c$Ethylene-Methyl Acrylate copolymer.
Transesterification catalyst: zinc acetate, purity > 99 wt. % (ZnAc$_2$, Sigma-Aldrich).

Components Mixing:

Twin Screw Extrusion Process

Prepare the resin mixtures using a ZSE-27 (L/D=48, D=28 mm, Leistritz) intermeshing co-rotating twin-screw extruder. The ZSE-27 co-rotating twin-screw extruder has a 34 kW motor and a maximum screw speed of 1200 rpm. Prepare the resin mixture by adding the components of the resin in the weight percent amounts shown in Table 2 to feed of the ZSE-27 intermeshing co-rotating twin-screw extruder operating at 1200 rpm to provide an output of 30 kg per hour.

Heat Lamination:
Conduct the heat lamination using the following steps:
Place 15 g of the resin mixture (Table 2) between two pieces of PET film (Sigma-Aldrich) having thickness of 0.1 mm, and then place PET films with polymer blend between two flat stainless-steel molds. Place the mold into the hot press machine pre-heated to a temperature of 200° C. Allow the mold to pre-heat in the hot press machine for 3 minutes. Laminate the PET film by pressing the mold for 1 minute at a pressure of 50 bar-g. Repeat this laminating step 5 times for a total of 6 pressings. After the sixth pressing, remove the mold from the hot press machine and allow the mold to cool at room temperature (23° C.) for 1 minute.

Peel Strength Test:
Measure the peel strength of the PET films using an INSTRON 5566 with the following. Use a sample width of 15 mm and a peel angle of 180° with a peel speed of 100 mm/min.

Resin—Examples and Comparative Examples

Make various blends using the twin screw extrusion process according to the formulae seen in Table 2. Test the bonding strength of the resins by following the process described above, with additional two benchmark of pure AMPLIFY EA100 and LOTRYL 24MA02. Details of the compounding formulation & test results are summarized in Table 2.

TABLE 2

Compounding formulation & test results for Comparative Examples A-C and Examples 1-2.

| Resin Mixture | Comparative Example A | Comparative Example B | Comparative Example C | Example 1 | Example 2 |
|---|---|---|---|---|---|
| DOWLEX ™ 2045G | | | 98 | | |
| AMPLIFY ™ EA100 | 100 | | | 98 | |
| LOTRYL ® 29MA03 | | 100 | | | 98 |
| ZnAc$_2$ | | | 2 | 2 | 2 |
| Peel Strength, N/15 mm | 0.1 | 31.9 | 0.1 | 33.5 | 52.7 |

As expected, pure AMPLIFY™ EA100 (Comparative Example A) provides a very weak bond between the PET films. LOTRYL® 29MA03 (Comparative Example B) shows a better bonding strength than AMPLIFY™ EA100 since ethylene methyl acrylate (EMA) has a higher polarity than ethylene ethyl acrylate (EEA). When adding 2 wt. % ZnAc$_2$ into EEA the bonding strength seen for Example 1 was improved dramatically from 0.1 N/15 mm to 33.5 N/15 mm, which is very significant. The same trends were observed for Example 2, in which the bonding strength increased from 31.9 N/15 mm (Comparative Example B) to 52.7 N/15 mm (Example 2). However, adding 2 wt. % ZnAc$_2$ into polyethylene (Comparative Example C) has no effect on the bonding strength to PET film. The data indicates that ZnAc$_2$ as transesterification catalyst may trigger the interfacial reaction of ethylene acrylate copolymer and PET.

We claim:

1. A resin for use as a tie layer in a multilayer structure, the resin consisting essentially of:
   (A) an ethylene acrylate copolymer formed from ethylene and alkyl acrylate, wherein the ethylene acrylate copolymer has an acrylate content of 10 to 30 weight percent and an ethylene content of 90 to 70 weight percent, where the weight percent is based on the total weight of the ethylene acrylate copolymer and the acrylate content and the ethylene content of the ethylene acrylate copolymer totals 100 weight percent; and
   (B) a transesterification catalyst selected from the group consisting of zinc acetate ($Zn(OOCH_3)_2$), titanium butoxide ($Ti(OBU)_4$), zinc oxide (ZnO) or combinations thereof;
   wherein the resin includes:
   30 to 99.999 weight percent of the ethylene acrylate copolymer based on the total weight of the resin;
   0.001 to 10 weight percent of the transesterification catalyst based on the total weight of the resin; and
   (C) 0 to 69.999 of a non-polar polyolefin based on the total weight of the resin, wherein the weight percent of the ethylene acrylate copolymer, the transesterification catalyst and the non-polar polyolefin of the resin totals 100 weight percent.

2. The resin of claim 1, wherein the alkyl acrylate is selected from the group consisting of methyl acrylate, ethyl acrylate, n-butyl acrylate, tert-butyl acrylate, isopropyl acrylate or mixtures thereof.

3. The resin of claim 1, wherein the resin includes:
   50 to 99.999 weight percent of the ethylene acrylate copolymer based on the total weight of the resin;
   0.001 to 5 weight percent of the transesterification catalyst based on the total weight of the resin; and
   0 to 49.999 of a non-polar polyolefin based on the total weight of the resin.

4. The resin of claim 1, wherein the resin includes:
   80 to 99.999 weight percent of the ethylene acrylate copolymer based on the total weight of the resin;
   0.001 to 2.5 weight percent of the transesterification catalyst based on the total weight of the resin; and
   0 to 19.999 of a non-polar polyolefin based on the total weight of the resin.

5. The resin of claim 1, wherein the non-polar polyolefin is selected from the group consisting of an ethylene based non-polar polyolefin, a propylene based non-polar polyolefin or combinations thereof.

6. The resin of claim 5, wherein the non-polar polyolefin is selected from the group consisting of polyethylene homopolymers, polypropylene homopolymers or combinations thereof.

7. The resin of claim 1, wherein the ethylene acrylate copolymer is an ethylene ethyl acrylate copolymer having an acrylate content of 15 weight percent and an ethylene content of 85 weight percent.

8. The resin of claim 7, wherein the transesterification catalyst is zinc acetate ($Zn(OOCH_3)_2$).

9. The resin of claim 8, wherein the resin includes 2 weight percent acetate ($Zn(OOCH_3)_2$) and 0 weight percent of the non-polar polyolefin based on the total weight of the resin.

10. The resin of claim 1, wherein the ethylene acrylate copolymer is an ethylene methyl acrylate copolymer having an acrylate content of 29 weight percent and an ethylene content of 71 weight percent.

11. The resin of claim 10, wherein the transesterification catalyst is zinc acetate ($Zn(OOCH_3)_2$).

12. A multilayer structure comprising at least three layers arranged in order Layer A/Layer B/Layer C, wherein each of the at least three layers has a first major surface and a second major surface opposite the first major surface, wherein:

Layer A comprises a polyolefin film;

Layer B comprises the resin of claim 1, wherein a first major surface of Layer B is in adhering contact with the second major surface of Layer A; and Layer C comprises polyethylene terephthalate film, wherein the first major surface of Layer C is in adhering contact with the second major surface of Layer B.

13. The multilayer structure of claim 12, wherein the polyolefin film is replaced by a second polyethylene terephthalate film different from Layer C.

14. A package formed with the multilayer structure of claim 12.

15. The multilayer structure of claim 12, wherein the polyolefin film is selected from the group consisting of a film of polyethylene, polypropylene or mixtures thereof.

16. The multilayer structure of claim 15, wherein the polyolefin film is a film of polyethylene.

* * * * *